July 24, 1962  A. G. SCHMIDT  3,045,544
STEREOSCOPIC SPECTACLE LOUPE
Filed June 20, 1957  2 Sheets-Sheet 2

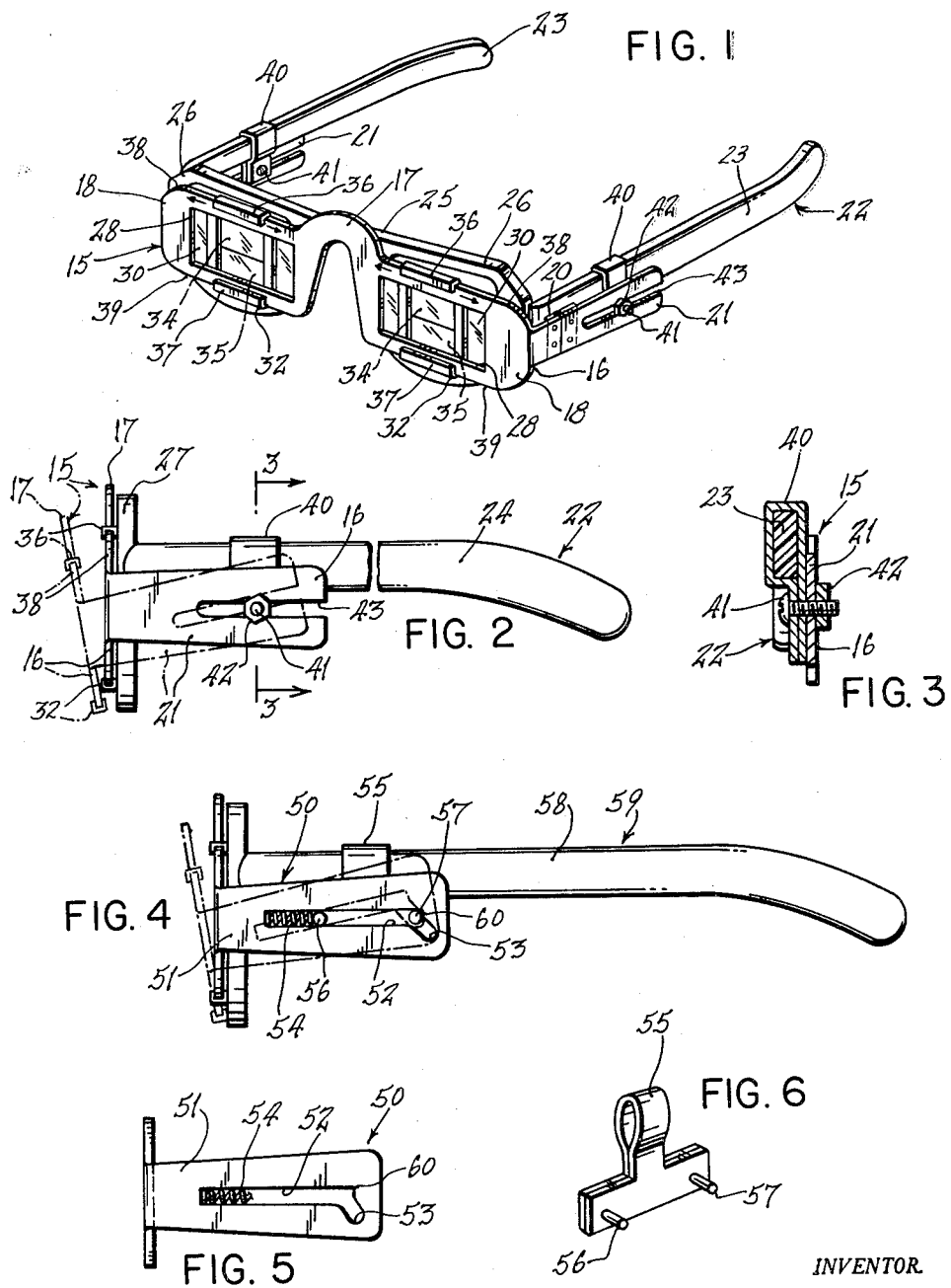

INVENTOR.
ARNO G. SCHMIDT
BY J Bradley Cohn
ATTORNEY

United States Patent Office 3,045,544
Patented July 24, 1962

3,045,544
STEREOSCOPIC SPECTACLE LOUPE
Arno G. Schmidt, 238 E. 86th St., New York, N.Y.
Filed June 20, 1957, Ser. No. 666,865
1 Claim. (Cl. 88—41)

This invention relates to a new and useful improvement in optical devices such as stereoscopic loupes and the like and is a continuation-in-part of my application, Serial No. 492,000 filed March 3, 1955 and now abandoned.

More particularly, the present invention proposes the construction of an improved optical device which may be pivoted at the temple to permit the ready selection of lenses of different power. The construction also provides for lateral adjustment of lenses for the purpose of varying the distance between pairs of lenses to accommodate to the pupillary span of different users.

It is thus an object of the invention to provide a binocular stereoscopical loupe having pairs of lenses of different power.

It is still another object of the invention to provide a binocular stereoscopical loupe providing for the interchangeability of different types of lenses including prismatic lenses and telescopic or telescopical types of loupes.

Still another object of the invention is to permit lateral adjustment of lenses both for the purpose of accommodating to the pupillary distance and for the additional purpose of permitting adjustment to a pair of lenses of different power.

It is still a further object of my invention to arrange an optical device so that it normally will be held in one given position and can be easily moved to another predetermined viewing position and is easily returnable to the original position.

The novel features which I believe to be characteristic of my invention are set forth in the appended claim. The invention itself, however, both as to its organization and method of operation may be understood by reference to the structure embodying my invention and shown in the accompanying drawings, in which:

FIG. 1 is a perspective view of a pair of spectacles and of an optical device constructed and arranged in accordance with the present invention;

FIG. 2 is a side view of the structure shown in FIG. 1;

FIG. 3 is a sectional view taken on line 3—3 of FIG. 2;

FIG. 4 is a view similar to FIG. 2 but illustrating a modification of the invention;

FIGS. 5 and 6 are detailed showings of the pivoting frames and supporting brackets shown in the embodiment of FIG. 4;

Figure 7:
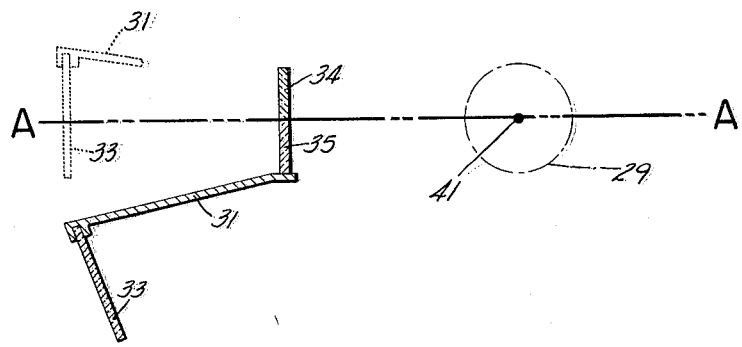
FIG. 7 is a schematic illustration of a further modification of the optical device which may be employed to provide an even further variety of magnification.

The optical device, in accordance with the first form of the present invention illustrated in FIGS. 1 to 3, inclusive, is designated generally by the reference numeral 15.

Optical device 15 has a frame 16 with a bridge 17, two eye portions 18, one on each side of the bridge, and a pair of arms 21 extending from the eye portions 18 of the frame.

The frame 16 is shown as a relatively rigid structure. It may, however, be hinged at 20 to permit folding of the arms 21, when the device is attached to a conventional spectacle frame such as 22 and it is desired to fold the spectacles in the usual fashion but with the optical device attached. For this purpose, the pivot point 41 should be loosened to provide a sliding motion in the groove 43.

Frame 16 is adapted to fit over and in front of a pair of spectacles 22. Arms are adapted to be disposed adjacent to and parallel with the temples 23 of the spectacles 22 when the bridge 17 of the frame overlies the bridge 25 of the spectacles 22 and the eye portions 18 overlie the eye pieces 26 of the spectacles.

The eye portions 18 of the frame of optical device 15 have lens openings 28, respectively, in which are mounted lens 30. The lens 30 may be regular lenses or other type or in some cases may be omitted entirely from the lens openings.

A pair of lens holders 32 are slidably mounted one on each of the eye portions 18 of frame 16 at the lens openings 28 and connected to the frame for lateral movement across the lens openings.

A pair of different lenses 34 and 35 are mounted in each lens holder 32 and disposed one above the other at the lens openings 28. The lenses 34 are the uppermost lenses in each lens holder and the lenses 35 are the lowermost lenses in each lens holder. Lenses 34 and 35 are preferably prismatic lenses to produce a stereoscopical effect, but the lenses 34 differ from lenses 35, as for example by having a different magnification. Prismatic stereoscopical lenses are a pair of lenses which in addition to their magnifying power are somewhat triangular in planar section. When used in a binocular loupe viewing a true image (i.e. a single object) the base or thicker portion of each lens is toward the other of the pair. Such a pair of lenses bend diverging light rays toward each other, thus relieving eye tension caused by convergence of the eyeballs when viewing close work. Such lenses are well known in the art and further description is not deemed necessary for an understanding of the invention.

One, two or more lenses of different magnifications power may be mounted in the lens holder. In one form of construction of the invention, one lens may have a focal length of 8″ with a magnification of 1¼ × respectively, 5 diopters and another lens may have a focal length of 4″ with a magnification of 2½ × respectively, 10 diopters may be used.

Lens holders 32 have flanged portions 36 and 37 which slidably fit over the edges 38 and 39 of the eye portions 18 of frame 16. Thus accessory lens holders 32 may be provided having further combinations of lenses for interchangeability. Mounting brackets 40 are provided for the pivotal mounting of the frame 16. The mounting brackets 40 are adapted removably to fasten the frame 16 to the temples 23 and 24 of spectacles 22. Brackets 40 as shown encircle the temples and are secured to frame 16 by pivot bolts 41 and nuts 42. The pivot bolts 41 are best located on the transverse axis of the eye, the transverse axis of the eye being that line passing through the temples and about which the eyeball moves when it is rotated upwardly and downwardly. It is obvious that other means may be used to support the pivot 41. For example, it might be secured directly to the temple or other similarly located support means, such as a head band.

Arms 21 are each made identical with a slotted opening 43 at its outer end slidably to fit around the bolts 41 and when so positioned the arms 21 are held in place by nuts 42 bearing against the arms 21 over the slotted openings 43. Thus, there is provided means pivotally to secure the arms 21 to the mounting brackets so that they will pivot upwardly and downwardly before the eye.

Figure 8:
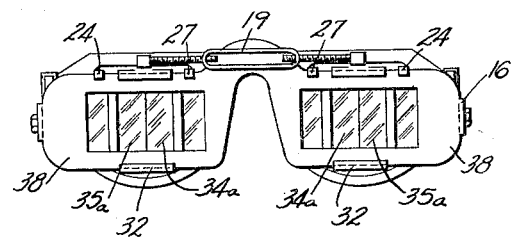
FIG. 8 is a front view of the optical device modified for inward and outward adjustment of the lenses.

Preferably lenses 34 and 35 are removably mounted in the lens holders 32 to snap in and out so that said lenses may be interchanged with pairs of different magnification. In FIG. 1 the lenses 34 and 35 are shown in position one above the other for purposes hereinafter explained. As shown in FIG. 8, the lenses 34a and 35a are placed side by side and adjusted inwardly and outwardly for operative and inoperative positions or to accommodate to the pupillary distance.

In FIG. 8 is illustrated an embodiment employing a suitable adjusting means such as the turnbuckle 19 which may be used to draw the lens holders 32 outwardly or inwardly to the adjustable clip stops 24 and 27, respectively, adjustably mounted on the edge 38 of the frame member 16. In this way, the pair of lenses 34a of one magnification may be brought into the line of use by a lateral movement of the lens holders 32, the pair of lenses 35a of a different magnification may be brought into play by inward movement of the lens holders 32. The adjustable clip stops 24 and 27 may be set along the edge 38 at a suitable point to locate the lenses properly with respect to the pupillary distance between the eyes of the particular user.

It should be here noted that the structure with or without the turnbuckle 19 or similar adjusting means may be used with lenses located one above the other as shown in FIG. 1. The sidewise adjustment in this case will, of course, be merely to accommodate for the selected pupillary distance of the particular user.

To use the optical device, the frame 16 is mounted at a pivot point 41 located substantially on the transverse horizontal axis of the eye. Referring to FIG. 1, one set of lenses 35 are brought into position before the eyes and frictionally held by the nut 42. When, however, it is desired to use a lens of different magnification, such as pair 34, the frame 16 is moved downwardly about the pivot point 41 to the dotted line position shown in FIG. 2. Because the lens frame is pivoted substantially about an axis of the eye, the lens when swung downwardly will be properly in the line of the visual axis of the eye.

Moreover, where the user normally seeks momentary use of a different magnification at a different position he has but to move his eyeballs upwardly or downwardly as the case may be to use the other lens. For example, if the user's normal work requires a higher magnification straight ahead of the eye and the occasional use of a lower magnification at a level above the eye. In this case, the lens 34 would be the lens of lower magnification and would be positioned slightly above the normal eye level of the user and the lens of higher magnification would be at eye level. The user could then use the lens at eye level for the normal work and peer upwardly through the lower magnification by simply rolling his eyes upward. Because of the location of pivot 41 about which both pairs of lenses pivot, the lens would be properly spaced from the eye in both positions of the eye.

In FIG. 7 a further embodiment of the invention may be observed. Here the pivot point 41 is located on the transverse axis of the eye 29 shown schematically in dotted line. Arm 21 or 51 and lenses 34 and 35 are as elsewhere explained with regard to FIGS. 1 to 6. However, extending forwardly from the frame 18 is a lens supporting bracket 31 carrying the lens 33. Lens 33 is angled as illustrated in FIG. 7 so as to be normal to a bisecting radius from pivot 41. When the arm 21 is swung upwardly to the dotted line position (FIG. 7) lens 33 becomes level with and in a plane normal to the visual axis A—A of the eye (line A, A being one of an infinite number of bisecting radii from pivot 31). This permits the use of still higher power for work remaining at the same distance from the eye of the user. For example, lens 33 may have a focal length of 3¼", a magnification of 3x, 13 diopter. This will permit for this magnification that the work be located, say 3¾ inches in front of the lens 33 and the eye will be 1¾ inches behind the lens 33 as determined by suitable length of the bracket 31. Thus the work will still be about 5 inches from the user's eye, as would be the case with the lenses of 2½ and 1¼ magnification above described and which could be used in lenses 35 and 34, respectively.

The modification of the invention illustrated in FIGS. 4, 5 and 6 is characterized by the provision of a frame 50 constructed similarly to frame 16 described above but having arms 51 (only one shown) each with a slotted opening 52 having a pin seating groove 53 at one end and spring 54 at the other or front end.

A pair of identically constructed mounting brackets 55 (only one shown) is provided. Each bracket 55 has a pair of spaced guide pins 56 and 57 projecting laterally from it. The brackets 55 each encircles one of the temples 58 of a pair of spectacles 59.

The two pins 56 and 57 are slidably seated in a single slotted opening 52 of the arms 51 with the spring 54 of that arm pressing against the front pin 56 and biasing the frame 50 forward so that the rear end edge 60 of the slotted opening 52 rests against the rear pin 37. In this manner, the frame is normally held in one predetermined position as shown in the solid lines of FIG. 4. However, when the user wishes to shift or pivot the frame 50 to its other predetermined position, he has only to move it until the rear pin 57 of each bracket is seated in the pin seating groove 53 of the arm 51 adjacent thereto. The frame may easily be returned to its original position by a similarly simple movement, in the reverse direction.

It is obvious that the structure of FIG. 7 may be utilized with either the arrangement of lenses 34, 35 or 34a, 35a of FIGS. 1 and 8. It is also obvious that the lenses of FIG. 8 may be interchangeable with those of FIG. 1.

While I have illustrated and described the preferred embodiments of my invention, it is to be understood that I do not limit myself to the precise constructions herein disclosed and that various changes and modifications may be made within the scope of the invention as defined in the appended claim.

I claim:

An optical device for spectacles comprising a frame having a bridge portion, two eye portions and a pair of arms extending from the eye portions and adapted to be disposed adjacent the temples of a pair of spectacles, said eye portions having lens openings therein, a pair of different lenses mounted at the lens opening of each eye portion of the frame and disposed one above the other at said lens opening, a pair of mounting brackets removably fastened to spectacle temples, means pivotally to secure said arms to said mounting brackets, said means having two predetermined arm holding positions, one position to dispose the lowermost lenses in eye alignment and the other position to dispose the uppermost lenses in eye alignment, said means including two spaced guide pins on said mounting brackets and said arms each having a slotted opening slidably to receive said guide pins with at least two recessed pin seating grooves for selectively seating one of the guide pins, to selectively position said arm in said predetermined positions and resilient members on the arms adjacent to and disposed in said slotted openings normally to bias the arm into one of the predetermined frame holding positions.

References Cited in the file of this patent

UNITED STATES PATENTS

| | | |
|---|---|---|
| 1,520,311 | Ruth | Dec. 23, 1924 |
| 1,742,049 | Rollins | Dec. 31, 1929 |
| 1,905,675 | Baker | Apr. 25, 1933 |
| 2,155,575 | Wittig | Apr. 25, 1939 |
| 2,158,642 | Tartrais | May 16, 1939 |
| 2,276,102 | Schwartz | Mar. 10, 1942 |
| 2,286,219 | Martinek | June 16, 1942 |
| 2,396,510 | Hulst | Mar. 12, 1946 |
| 2,459,021 | Frommer | Jan. 11, 1949 |
| 2,659,266 | Swisher | Nov. 17, 1953 |
| 2,842,029 | Roth | July 8, 1958 |

FOREIGN PATENTS

| | | |
|---|---|---|
| 248,851 | Germany | July 3, 1912 |
| 29,167 | France | Mar. 3, 1925 |
| | (1st addtion to 570,625) | |
| 1,040,790 | France | May 27, 1953 |